United States Patent [19]

Ishigaki et al.

[11] Patent Number: 5,829,264
[45] Date of Patent: Nov. 3, 1998

[54] AIR CONDITIONER HAVING REFRIGERANT PRESSURE CONTROL MEANS AND DRIVING CONTROL METHOD THEREFOR

[75] Inventors: Shigeya Ishigaki, Ohra-machi; Mikiyasu Sinnsi, Ohizumi-machi; Tomohito Koizumi, Ota; Katuyuki Tuno, Ashikaga; Takahiro Suzuki, Ohizumi-machi; Masanori Akutu, Isezaki; Norio Abukawa, Ota, all of Japan

[73] Assignee: Sanyo Electric Co., Ltd., Osaka, Japan

[21] Appl. No.: 746,749

[22] Filed: Nov. 14, 1996

[30] Foreign Application Priority Data

Nov. 17, 1995 [JP] Japan .................................. 7-300129

[51] Int. Cl.⁶ ........................................ F25B 1/00
[52] U.S. Cl. ............................ 62/228.3; 62/114; 62/502
[58] Field of Search ............................. 62/228.3, 228.4, 62/502, 114

[56] References Cited

U.S. PATENT DOCUMENTS

| | | | |
|---|---|---|---|
| 4,218,890 | 8/1980 | Vakil et al. | 62/502 X |
| 4,798,057 | 1/1989 | Okamoto et al. | 62/228.3 |
| 4,831,836 | 5/1989 | Matsuoka | 62/228.4 X |
| 5,259,211 | 11/1993 | Ikeda | 62/228.4 |
| 5,295,363 | 3/1994 | Oomura et al. | 62/228.4 X |

Primary Examiner—Henry A. Bennett
Assistant Examiner—Susanne C. Tinker
Attorney, Agent, or Firm—Darby & Darby

[57] ABSTRACT

An air conditioner including at least two kinds of refrigerant which are circulated in a refrigerant circuit and have different characteristics, a calculator for calculating the driving capacity of a compressor in accordance with a request load of the refrigerant circuit and outputting a driving capacity signal representing the driving capacity, a driving unit for controlling the driving capacity of the compressor so as to obtain the driving capacity corresponding to the driving capacity signal of the calculator, and correcting means for correcting the driving capacity signal so as to reduce the driving capacity when the refrigerant pressure in the refrigerant circuit exceeds a first pressure value.

7 Claims, 6 Drawing Sheets

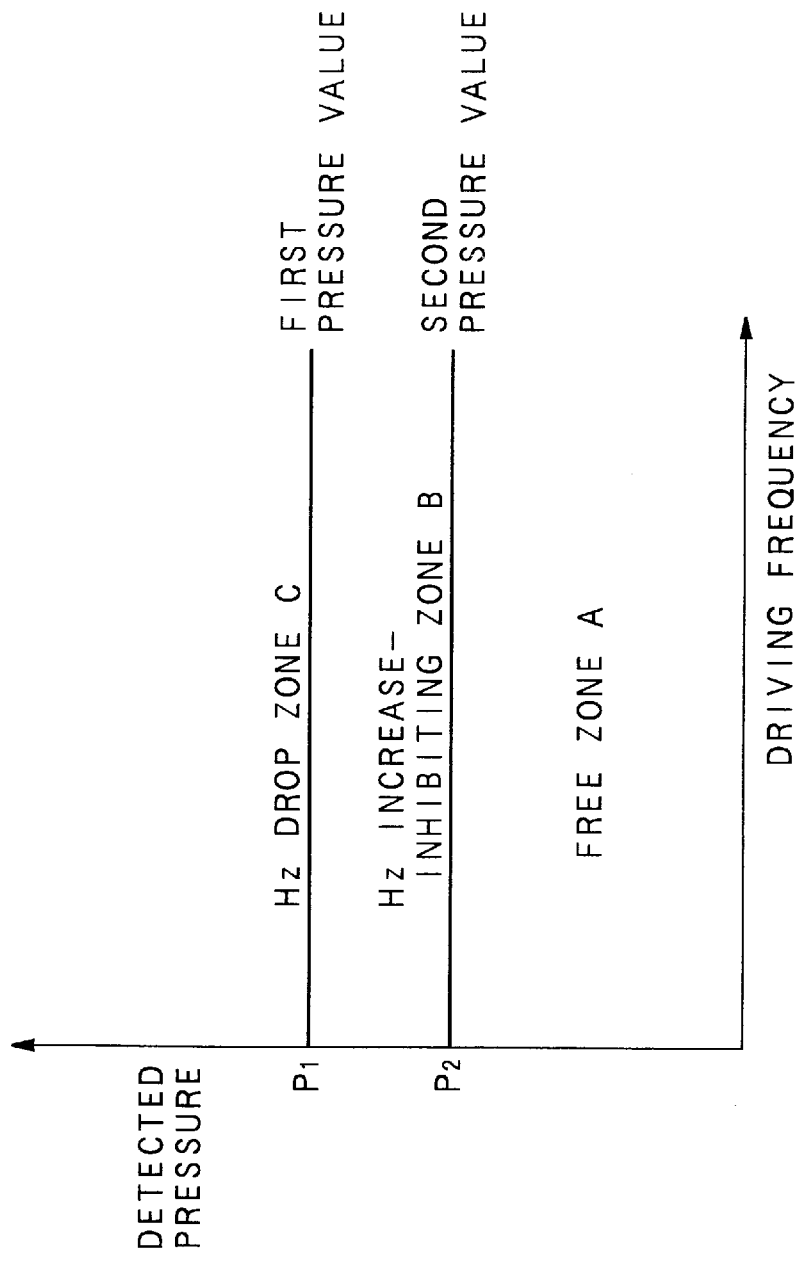

AIR CONDITIONER HAVING REFRIGERANT PRESSURE CONTROL MEANS AND DRIVING CONTROL METHOD THEREFOR

BACKGROUND OF THE INVENTION

1. Field of the Invention

The present invention relates to an air conditioner having a capacity-variable type compressor in which refrigerant discharge capacity is variable, and a method for driving the air conditioner, and more particularly to an air conditioner using mixture refrigerant which is composed of at least two kinds of refrigerant having different characteristics, and a method for driving the air conditioner.

2. Description of Related Art

In general, an air conditioner has a refrigerant circuit which is constructed by connecting a compressor, a four-way change-over valve, a condenser, an expansion device (pressure-reducing device) and an evaporator through a refrigerant pipe, and refrigerant is caused to be circulated in the refrigerant circuit to perform cooling/heating operation.

During the circulation, the refrigerant is compressed by and discharged from the compressor to be circulated in the refrigerant circuit as described above, so that there is produced predetermined refrigerant pressure in the refrigerant circuit. The refrigerant circuit is designed to have sufficient mechanical resistance to such predetermined refrigerant pressure from a safety standpoint. However, when the outside air temperature rises up to an unexpected value, the refrigerant pressure in the refrigerant circuit may abnormally rise up to a value which is over the maximum permissible value which is determined in consideration of various external environmental effects. In this case, the refrigerant circuit is liable to be damaged or broken down. Therefore, the driving of the compressor in the refrigerant circuit is stopped to prevent the abnormal increase of the refrigerant pressure in the refrigerant circuit.

Furthermore, materials such as R-12, etc. containing chlorine groups have been hitherto used as refrigerant which is to be filled in the refrigerant circuit. However, such materials have the potential to break down the ozone layer over the land.

Therefore, for the purpose of environmental protection, in place of these materials, R-22 (chlorodifluoromethane) having a less amount of chlorine groups, R-32 (difluoromethane), R-125 (pentafluoroethane) or R-134a (tetrafluoroethane) which has no chlorine group, or a mixture of these materials (hereinafter referred to as "HFC-based refrigerant") have been recently used as substitute refrigerant.

As compared with such a situation that single refrigerant (e.g., R-22) is used, the driving pressure becomes higher in a situation where an HFC-based refrigerant is used as refrigerant.

This phenomenon is inherent to the mixture refrigerant, and abnormal pressure is liable to occur in the refrigerant circuit. For example, when mixture refrigerant is used, the refrigerant pressure increases to about 1.5 time as high as that in the single-refrigerant case.

When the HFC-based refrigerant which is generally caused to have high pressure during the driving operation is used as refrigerant in a conventional refrigerant circuit (a refrigerant pipe, a refrigerant equipment, etc.), the refrigerant circuit would be broken down if it is used with no countermeasure. Therefore, in order to prevent the refrigerant circuit from being broken down, the driving of the compressor must be stopped as described above.

However, if the compressor is stopped under operation, the driving capacity of the air conditioner is interrupted or reduced. Particularly when mixture refrigerant is used, the driving of the compressor is more frequently stopped, and thus the driving of the air conditioner itself must be more frequently stopped. This is inconvenient to users.

Furthermore, the resistance-to-pressure of the refrigerant circuit may be reconsidered. However, in order to reconsider the resistance-to-pressure of the refrigerant, the mechanical strength of each of elements such as the refrigerant pipe, the refrigerant equipment, etc. must be changed, and particularly the refrigerant pipe must be designed to have a larger thickness, so that the weight and size of the refrigerant circuit increase.

SUMMARY OF THE INVENTION

An object of the present invention is to provide an air conditioner which can prevent occurrence of abnormally high pressure in a refrigerant circuit and also prevent reduction in driving capacity with a simple construction, and a method for controlling the driving of the air conditioner.

In order to attain the above object, according to a first aspect of the present invention, an air conditioner which is provided with a refrigerant circuit comprising a capacity-variable type compressor, a condenser, an expansion device and an evaporator, and in which the driving capacity of the compressor is controlled on the basis of a request load of the refrigerant circuit, includes at least two kinds of refrigerant which are circulated in the refrigerant circuit and have different characteristics, a calculator for calculating the driving capacity of the compressor in accordance with the request load of the refrigerant circuit to output a driving capacity signal representing the driving capacity, a driving unit for controlling the driving capacity of the compressor so as to obtain the driving capacity corresponding to the driving capacity signal of the calculator, and first correction means for correcting the driving capacity signal so as to reduce the driving capacity when the refrigerant pressure in the refrigerant circuit exceeds a first pressure value.

According to the first aspect of the present invention, when the refrigerant pressure in the refrigerant circuit is higher than the first pressure value, the first correction means corrects the driving capacity signal so that the driving capacity is reduced to be lower than the present driving capacity even when the request load indicates increase of the present driving capacity, and instructs the driving unit to control the driving capacity of the compressor. Accordingly, the abnormally high pressure can be prevented from occurring in the refrigerant circuit without stopping the driving of the compressor by a simple construction, whereby reduction of the driving capacity due to interruption of the driving of the compressor can be prevented. Even when mixture refrigerant is particularly used as refrigerant, a conventional pressure-proof refrigerant circuit is usable.

The air conditioner as described above may be further provided with second correction means for correcting the driving capacity signal so as to inhibit the driving capacity from further increasing when the refrigerant pressure in the refrigerant circuit exceeds a second pressure value which is lower than the first pressure value.

According to the air conditioner as described above, when the refrigerant pressure of the refrigerant circuit is higher than the first pressure value, the compressor is driven at a driving capacity which is lower than the present driving capacity. In addition, when the refrigerant pressure in the refrigerant circuit exceeds the second pressure value which is lower than the first pressure value, the present driving capacity is inhibited from increasing by the second correction means. Accordingly, in the range from the first pressure value to the second pressure value, the driving capacity of the compressor is inhibited from further increasing, and at the same time the driving capacity of the compressor is kept not to be reduced, thereby preventing occurrence of abnormally high pressure in the refrigerant circuit.

In the air conditioner as described above, the second pressure value is set to a value which is lower than the first pressure value by an amount corresponding to 2% to 3% of the first pressure value.

This rate (from 2% to 3%) is determined for the following reason. If the reduction rate is less than 2%, even when the pressure-increase inhibiting operation is carried out, the refrigerant pressure in the refrigerant circuit would exceed the first pressure value because a pressure detect detects the pressure with a time delay. On the other hand, if the reduction rate is more than 3%, the driving of the compressor is liable to be restricted, and thus the driving capacity cannot be effectively kept. In addition, from the viewpoint of pulsation of the refrigerant in the refrigerant circuit, the rate (2% to 3%) is preferable to achieve a comfortable air conditioning with the air conditioner.

According to a second aspect of the present invention, a method for controlling an air conditioner which is provided with a refrigerant circuit comprising a capacity-variable type compressor, a condenser, an expansion device and an evaporator, and in which the driving capacity of the compressor is controlled on the basis of a request load of the refrigerant circuit, comprises the steps of circulating at least two kinds of refrigerant having different characteristics in the refrigerant circuit, calculating the driving capacity of the compressor in accordance with the request load of the refrigerant circuit to output a driving capacity signal representing the driving capacity, controlling the driving capacity of the compressor so as to obtain the driving capacity corresponding to the driving capacity signal, and correcting the driving capacity signal so as to reduce the driving capacity when the refrigerant pressure in the refrigerant circuit exceeds a first pressure value.

The control method as described above may further comprise the step of correcting the driving capacity signal so as to inhibit the driving capacity from further increasing when the refrigerant pressure in the refrigerant circuit exceeds a second pressure value which is lower than the first pressure value.

According to the control method as described above, in the range from the first pressure value to the second pressure value, the driving capacity of the compressor is inhibited from further increasing, and at the same time the driving capacity of the compressor is kept not to be reduced, thereby preventing occurrence of abnormally high pressure in the refrigerant circuit.

BRIEF DESCRIPTION OF THE DRAWINGS

FIG. 6 is a graph showing the relationship between the detected pressure and the control of the driving rotational number.

DETAILED DESCRIPTION OF THE PREFERRED EMBODIMENT

A preferred embodiment according to the present invention will be described hereunder with reference to the accompanying drawings.

Figure 1:
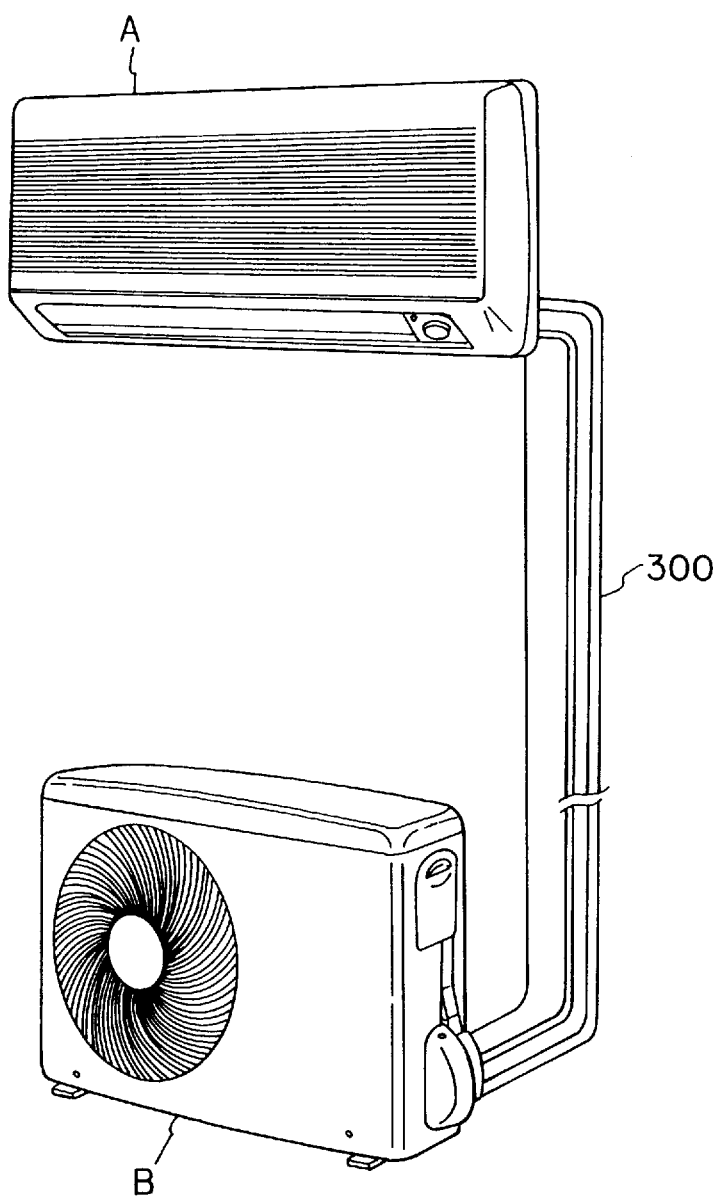
FIG. 1 is a perspective view showing an air conditioner according to an embodiment of the present invention.

FIG. 1 is a perspective view showing a general domestic air conditioner. This type of air conditioner comprises an user-side unit A (indoor unit) disposed in a room, and a heat-source side unit B (outdoor unit) disposed at the outside, and these indoor and outdoor units A and B are connected to each other through a refrigerant pipe 300.

Figure 2:
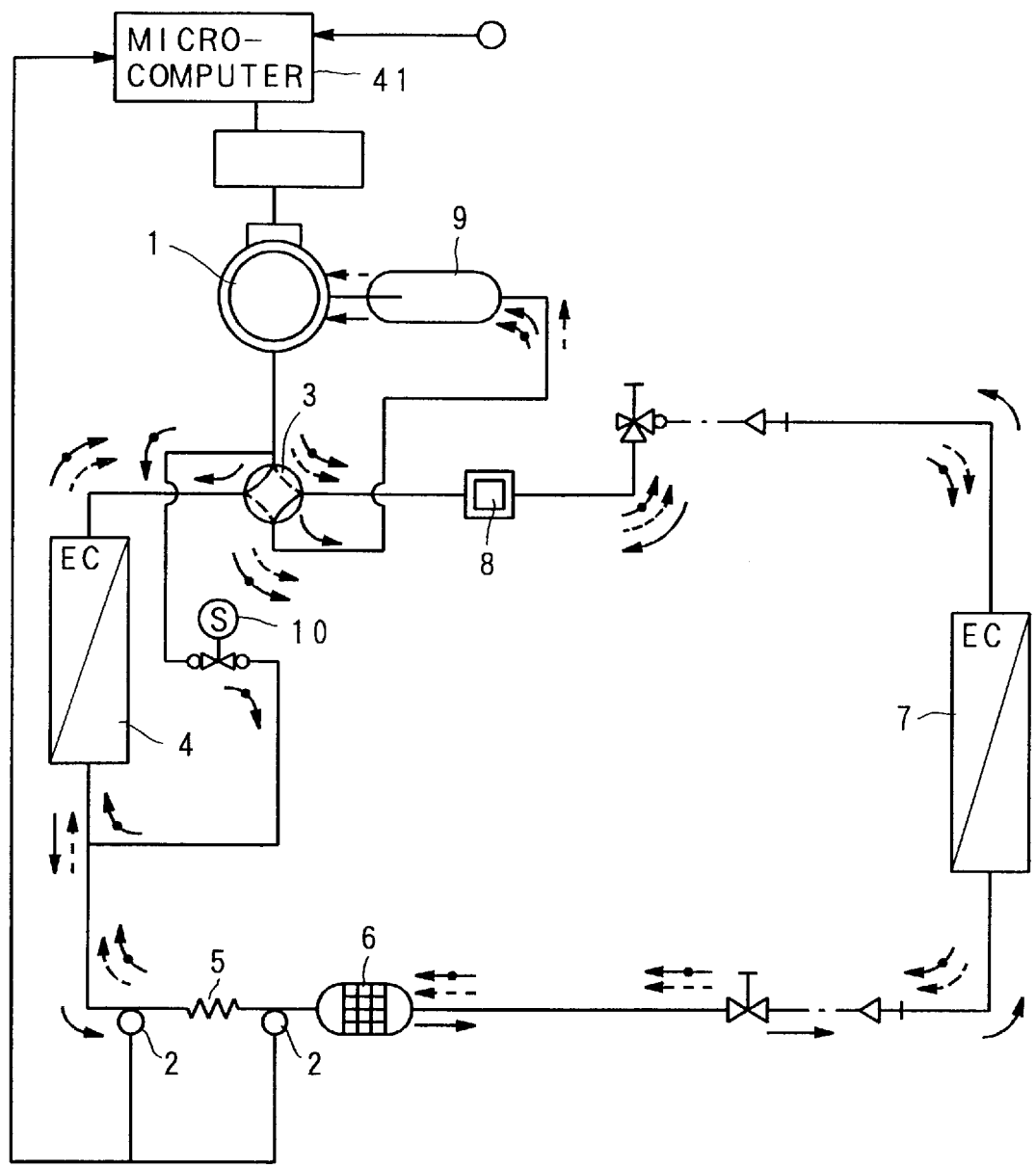
FIG. 2 is a refrigerant circuit diagram of the air conditioner shown in FIG. 1.

FIG. 2 is a refrigerant circuit diagram showing a refrigeration cycle of the air conditioner shown in FIG. 1.

Reference numeral 1 represents an inverter type compressor (capacity-variable type compressor) comprising a motor portion and a compressor portion which is driven by the motor portion. The inverter type compressor is subjected to rotational number control by an inverter switch as described later. A voltage control method using a DC motor or a discharge amount control method using a unload valve may be used as another capacity-variable control manner for the compressor. As not shown, a muffler is provided to suppress vibration/noise due to pulsation of refrigerant which is discharged from the inverter type compressor (hereinafter merely referred to as "compressor") 1.

Reference numeral 3 represents a four-way change-over valve for switching a refrigerant flow direction under cooling/heating operation, reference numeral 4 represents a heat exchanger at the outdoor unit (outdoor heat exchanger), reference numeral 5 represents a capillary tube, reference numeral 6 represents a screen filter, reference numeral 7 represents a heat exchanger at the indoor unit (indoor heat exchanger), reference numeral 8 represents a muffler, reference numeral 9 represents an accumulator, and reference numeral 10 represents an electromagnetic opening/closing valve.

Further, pressure sensors 2 which serve as pressure detecting means for detecting the discharge or circulating pressure of the refrigerant and are used for cooling and heating operation respectively, are provided at the discharge side of the compressor 1. The pressure sensors 2 are used to detect abnormally high pressure in the refrigerant circuit, and disposed at the front and rear sides of the capillary tube respectively. Each of the pressure sensors 2 is connected to a microcomputer 41 serving as a controller, and outputs a detection signal to the microcomputer 41. Each pressure sensor 2 may be designed to detect the refrigerant pressure at all times, or to detect the refrigerant pressure every time it receives a detection instruction which is output every predetermined time from the microcomputer 41.

According to the refrigerant circuit thus constructed, the flow direction of the refrigerant which is discharged from the compressor 1 is selectively set to one of three modes (directions) as indicated by a solid arrow (cooling operation), a dotted arrow (heating operation) and a solid arrow with a circle (defrosting operation) in accordance with the switching position of the four-way change-over valve 3 and the open/close state of the electromagnetic valve 10.

In the cooling operation, the outdoor heat exchanger 4 at the heat-source side serves as a condenser while the indoor heat exchanger 7 at the user side serves as an evaporator. On the other hand, in the heating operation, the user-side heat exchanger 7 serves as a condenser while the heat exchanger 4 at the heat-source side serves as an evaporator. Further, in the defrosting operation (under the heating operation), a part of the high-temperature refrigerant which is discharged from the compressor 1 is directly supplied to the heat exchanger 4 at the heat-source side so that the temperature of the heat exchanger 4 at the heat-source side is increased to thereby defrost the heat exchanger 4.

When the defrosting operation is not sufficiently performed (particularly when the outside air temperature is excessively low), the defrosting operation is forcedly performed by an inverted cycle defrosting operation (flow as indicated by a solid arrow).

Figure 3:
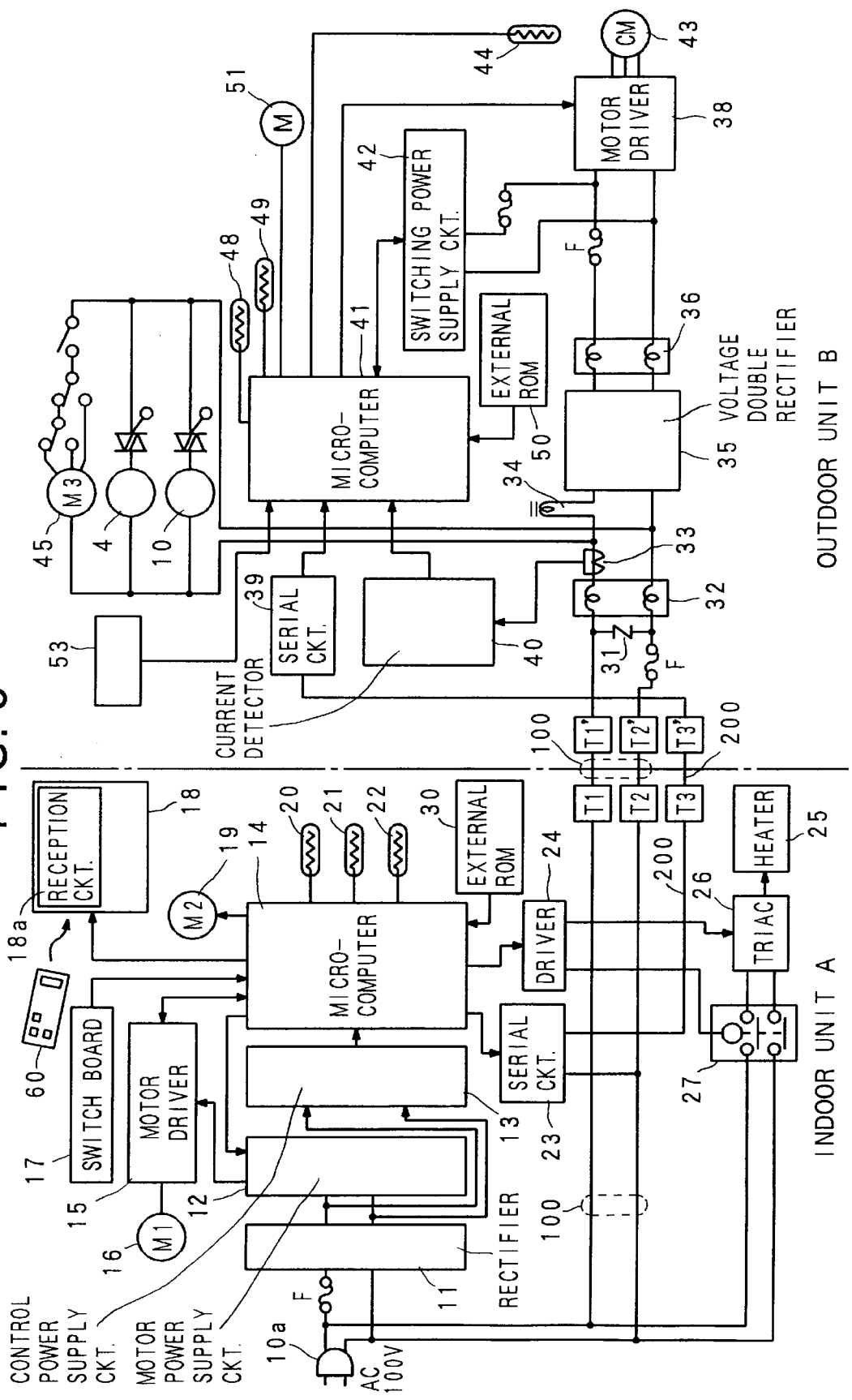
FIG. 3 is a control circuit diagram of the air conditioner shown in FIG. 1.

FIG. 3 is a diagram showing a control circuit for the air conditioner. The left side with respect to the one-dotted chain line at the center of FIG. 3 shows a control circuit of the indoor unit A, and the right side shows a control circuit of the outdoor unit B. Both the control circuits are connected to each other through a capacity line and a control signal line 200.

In the indoor unit A are provided a capacity supply circuit 12 for a motor, a capacity supply circuit 13 for control, a motor driving circuit 15, a switch board 17, a reception circuit 18a, a display board 18 and a flap motor 19.

A rectifying circuit 11 serves to rectify an alternating voltage of 100 V which is supplied from a plug 10a. The motor capacity supply circuit 12 adjusts a DC voltage supplied to a DC fan motor 16 so as to be equal to 10 to 36 V. The DC fan motor 16 serves to blow out into a room the air which has been air-conditioned in accordance with a signal transmitted from the microcomputer 14.

The control capacity supply circuit 13 generates a DC voltage of 5 V to be supplied to the microcomputer 14. In response to the signal from the microcomputer 14, the motor driving circuit 15 controls a capacity supply timing at which the capacity (current) is supplied to the winding of a stator on the basis of rotational numberal position information of the DC fan motor 16.

The switch board 17 is fixed to an operation panel of the unit A at the user side, and it is provided with an on/off switch, a test driving switch, etc. The reception circuit 18a receives a remote control signal (for example, on/off signal, cooling/heating switching signal, a room temperature setting signal, etc.) from a wireless remote controller 60. The display board 18 displays the driving status of the air conditioner. The flap motor 19 functions to move the flap for changing the blow-out direction of the cooled/heated air.

The control circuit of the indoor unit A includes a room temperature sensor 20 for detecting the room temperature, a heat exchanger temperature sensor 21 for detecting the temperature of the heat exchanger at the user side, and a humidity sensor 22 for detecting the indoor humidity. The detected values which are detected by these sensors are subjected to analog-to-digital conversion, and then input to the microcomputer 14.

The control signal from the microcomputer 14 is transmitted through a serial circuit 23 and a terminal board T3 to the unit B at the heat source side (outdoor unit). A TRIAC (triode AC switch) 26 and a heater relay 27 are controlled through a driver 24 by the microcomputer 14 to stepwise adjust the capacity to be supplied to a re-heating heater 25 which is used for dry operation.

Reference numeral 30 represents an external ROM for storing the specific data representing the type and charac- teristics of the air conditioner. These specific data are taken out from the external ROM 30 just after the capacity switch is turned on and the operation is stopped. When the capacity switch is turned on, neither any command is input from the wireless remote controller nor the detection of the status of the ON/OFF switch or the test driving switch (the operation thereof will be described later) is performed unless the take-out of the specific data from the external ROM 30 is completed.

Next, the control circuit of the heat-source side (outdoor) unit B will be described.

In the heat-source side unit B, terminal boards T'1, T'2 and T'3 are connected to the terminal boards T1, T2 and T3 disposed at the user-side unit A, respectively. Reference numeral 31 represents a varistor which is connected to the terminal boards T'1 and T'2 in parallel, reference numeral 32 represents a noise filter, reference numeral 34 represents a reactor, reference numeral 35 represents a voltage doubler rectifying circuit for doubling an input voltage, and reference numeral 36 represents a noise filter.

Reference numeral 39 represents a serial circuit for converting the control signal supplied from the user-side unit A through the terminal board T'3, and the converted signal is transmitted to the microcomputer 41. Reference numeral 40 represents a current detector for detecting current which is supplied to a load in a current transformer (CT) 33 of the heat-source side unit B, and it serves to rectify the detected current to a DC voltage and supply the DC voltage to the microcomputer 41. Reference numeral 41 represents a microcomputer, reference numeral 42 represents a switching capacity supply circuit for generating an operating capacity for the microcomputer 41, and reference numeral 38 represents a motor driver in which PWM control is performed on the capacity to be supplied to a compressor motor as described later on the basis of the control signal from the microcomputer 41. The motor driver 38 constitutes a so-called inverter unit comprising six capacity transistors which are connected to one another in the form of a three-phase bridge.

Reference numeral 43 represents a compressor motor for driving the compressor 1 of the refrigeration cycle, and reference numeral 44 represents a discharge-side temperature sensor for detecting the temperature of the refrigerant at the discharge side of the compressor. Reference numeral 45 represents a fan motor whose rotational numberal number is controlled in three stages (levels), and which serves to blow out the air to the outdoor heat exchanger. The four-way change-over valve 3 and the electromagnetic valve 10 function to switch the refrigerant pass in the refrigeration cycle. In the heat-source side unit B, an outside air temperature sensor 48 for detecting the outside air temperature is disposed in the vicinity of the air intake port, and an outdoor heat exchanger temperature sensor 49 for detecting the temperature of the outdoor heat exchanger is also disposed. In this embodiment, the pressure sensor 2 for detecting the refrigerant pressure is further disposed at the discharge-side of the compressor 1 as described above. The detection values which are obtained by the temperature sensors 48 and 49 and the pressure sensors 2 are subjected to the A/D conversion and then input to the microcomputer 41.

Reference numeral 50 represents an external ROM having the same function as the external ROM 30 of the user-side unit A. The specific data of the heat-source side (outdoor) unit B contain a first pressure value P1 which is used to determine a pressure-increase inhibition zone when the driving rotational number of the compressor is controlled as described later, and a second pressure value P2 which is lower than the first pressure value. The external ROM 50 is also stored with a predetermined pressure-drop rate at which the pressure value of the refrigerant is reduced in a pressure-drop zone where the refrigerant pressure is above the pressure value P1, and it constitutes a rotational number control means for controlling the motor driver 38 through the microcomputer 41.

The symbol F in each of the control circuits of the heat-source side unit B and the user-side unit A represents a fuse.

The microcomputer (control circuit) 14 (41) includes a ROM in which programs are beforehand stored, a RAM in which reference data are stored, and a CPU for executing the programs, these elements being mounted on the same chip (for example, 87C196MC (MCS-96 series) sold by Intel Corporation).

Next, the refrigerant will be described.

According to this embodiment, refrigerant which has high pressure under operation is suitably usable, and both single refrigerant and mixture refrigerant may be used. For example, R-410A or R-410B may be used. R-410A is mixture refrigerant of two-component system, and it is formed of R-32 of 50 Wt % and R-125 of 50 Wt %. R-410A has a boiling point of −52.2° C. and a dew point of −52.2° C. R-410B is formed of R-32 of 45 Wt % and R-125 of 55 Wt %. In a comparison test for both the above-described two-component mixture refrigerant and conventional single refrigerant (i.e., HCFC-22) under the same condition, the discharge temperature of the compressor was equal to 66.0° C. for HCFC-22 and 73.6° C. for R-140A, and the condensation pressure was equal to 17.35 bar for HCFC-22 and 27.30 bar for R-410A. Further, the evaporation pressure was equal to 6.79 bar for HCFC-22 and 10.86 bar for R-410A. In short, the two-component mixture refrigerant has higher temperature and higher pressure than the single refrigerant (HCFC-22) as the whole refrigerant circuit.

On the other hand, when azeotropic mixture refrigerant of R-410A and R-410B is used, the refrigerant composition varies less because both the refrigerant components have the proximate boiling points, and thus it is unnecessary to consider a temperature glide problem due to the variation of the refrigerant composition. Therefore, the control of the refrigerant under operation can be easily performed.

Next, the operation of the air conditioner according to this embodiment will be described.

In the cooling operation, as indicated by an arrow of solid line of FIG. 2, the refrigerant discharged from the compressor 1 is circulated in the refrigerant circuit in the order of the muffler 2, the four-way change-over valve 3, the heat exchanger at the heat source side (outdoor heat exchanger) 4, the capillary tube 5 serving as the expansion device, the screen filter 6, the heat exchanger at the user side (indoor heat exchanger) 7, the muffler 8, the four-way change-over valve 3 and the accumulator 9. The indoor heat exchanger 7 serves as an evaporator, and the pressure of the refrigerant is reduced by the capillary tube 5.

In the heating operation, as indicated by an arrow of broken line of FIG. 2, the refrigerant discharged from the compressor 1 is circulated in the refrigerant circuit in the order of the muffler 2, the four-way change-over valve 3, the muffler 8, the user-side heat exchanger (indoor heat exchanger) 7, the screen filter 6, the capillary tube 5, the heat-source side heat exchanger (outdoor heat exchanger) 4, the four-way change-over valve 3 and the accumulator 9.

The outdoor heat exchanger 4 serves as an evaporator, and the pressure of the refrigerant is reduced by the capillary tube 5.

According to this embodiment, R-410A or R-410B which is the two-component mixture refrigerant as described above is used.

Therefore, as compared with the situation where the single refrigerant is used, the refrigerant pressure in the refrigerant pipe is high. On the other hand, the refrigerant circuit has an upper limit in resistance to refrigerant pressure (i.e., has the maximum permissible pressure value). Particularly when mixture refrigerant is used in a refrigerant circuit which is designed to use single refrigerant, it is required to control the refrigerant circuit so that the refrigerant pressure is prevented from increasing to an abnormally high pressure (i.e., over the maximum permissible pressure value).

In order to satisfy this requirement, according to this embodiment, the pressure sensors 2 for detecting the refrigerant pressure are provided to the refrigerant circuit. The driving of the compressor (the discharge amount of the refrigerant from the compressor) is controlled on the basis of the detected pressure value so that the refrigerant pressure in the refrigerant circuit is prevented from increasing to abnormally high pressure.

The control of the driving of the compressor will be hereunder described.

Figure 4:
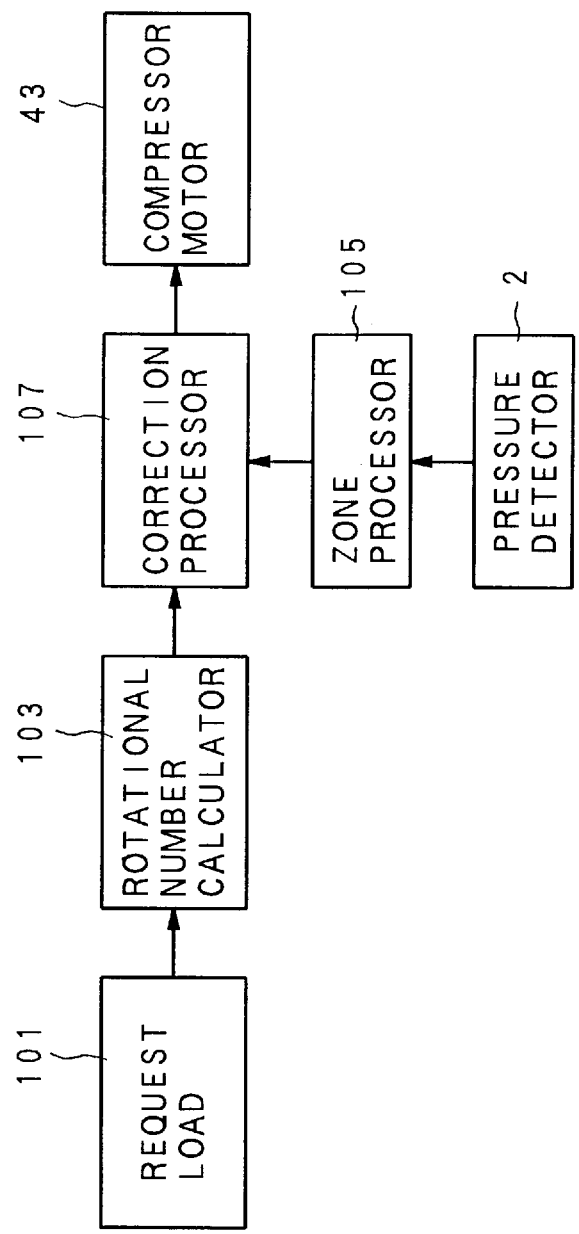
FIG. 4 is a block diagram showing a main control operation of an inverter compressor used in the air conditioner shown in FIG. 1.

FIG. 4 is a block diagram showing a main control portion of the compressor.

A request load unit 101 receives a request load which is calculated on the basis of the difference value between a target temperature set by a remote controller 60 and the present room temperature and changed value of this difference value, or a request load which is based on a quick cooling instruction or the like. A rotational number calculating unit (calculator) 103 calculates the driving rotational number of the compressor in accordance with the request load.

Furthermore, upon receiving the pressure signal from the pressure detectors 2, a zone processing unit (zone processor) 105 specifies a pressure zone to which the detected pressure belongs, and then outputs a correction command corresponding to the zone. That is, the zone processor 105 detects a pressure zone to which the present refrigerant pressure belongs. The pressure zone is divided into three zones: a free zone A where the detected pressure value P of the pressure detector 2 is lower than the second pressure value (P<P2), an increase-inhibiting zone B where the detected pressure value P is not less than the second pressure value P2 and not more than the first pressure value P1 (P2≦P≦P1), and a drop zone where the detected pressure value P is more than the first pressure value P1 (P>P1) as shown in FIG. 6. On the basis of the detection result, the zone processor 105 outputs a correction signal corresponding to each zone to a correction processor (correction processing means) 107.

The correction processor 107 corrects the driving rotational number of the compressor which is calculated by the rotational number calculator as described above, and then outputs a driving signal to the motor of the compressor to drive the compressor motor on the basis of the corrected rotational number. That is, in the correction processor 107, the following control is performed on the rotational number calculated by the rotational number calculator 103.

If the detected pressure P belongs to the free zone A (P<P2), the correction processor 107 performs no correction on the driving rotational number from under unit A. Accordingly, the compressor 1 is directly driven in accordance with the value which is calculated on the basis of a request load transmitted from the remote controller 60 or the like.

On the other hand, if the detected pressure P belongs to the increase-inhibiting zone B (P2≦P≦P1), the correction processor 107 inhibits such an instruction signal instructing the increase of the driving rotational number to the values calculated by the rotational number calculator 103. That is, even when a request for further increasing the air-conditioning load is received, the correction processor 107 keeps the driving status (driving rotational number) of the compressor to the present driving status (driving rotational number), and it outputs to the driving unit a driving signal for driving the compressor at a new driving rotational number only when it receives a request for reducing the compressor capacity.

If the detected pressure P belongs to the drop zone C (P>P1), the correction processor 107 invalidate the signal from rotational number calculator 103, and outputs to the compressor a driving signal for reducing the present driving rotational number. The reduction rate of the driving rotational number in the drop zone C is not limited to a specific value, however, it is preferable to reduce the rotational number (if the compressor has the induction motor, the decreasing rate is 1 Hz or 2 Hz per second. If the compressor has the PC motor, the decreasing rate is 100 or 200 rotational number per second.) Here, the first pressure value P1 and the second pressure value P2 will be described.

The first pressure value P1 is set to the maximum permissible pressure value of the refrigerant circuit or a value proximate to the value. For example, it is generally set to about 35 kg/cm$^2$ for a domestic air conditioner using single refrigerant. The second pressure value P2 is preferably set to a value which is lower than the first pressure value P1 by 2% to 3% of the first pressure value P1. For example when the first pressure value P1 is set to about 35 kg/cm$^2$, the second pressure value P2 is set to 34 kg/cm$^2$.

The drop rate (2% to 3%) of the second pressure value P2 with respect to the first pressure value P1 is determined for the following reason. If the drop rate is less than 2% (i.e, the second pressure value P2 is reduced to a value lower than the first pressure value P1 by an amount less than 2% of P1), the refrigerant pressure immediately exceeds the first pressure value due to a response delay or an error caused by pulsation. On the other hand, if the drop rate is more than 3%, the recurrent current from motor is increased, and thus the driving capacity itself cannot be kept to a fixed stable value.

Figure 5:
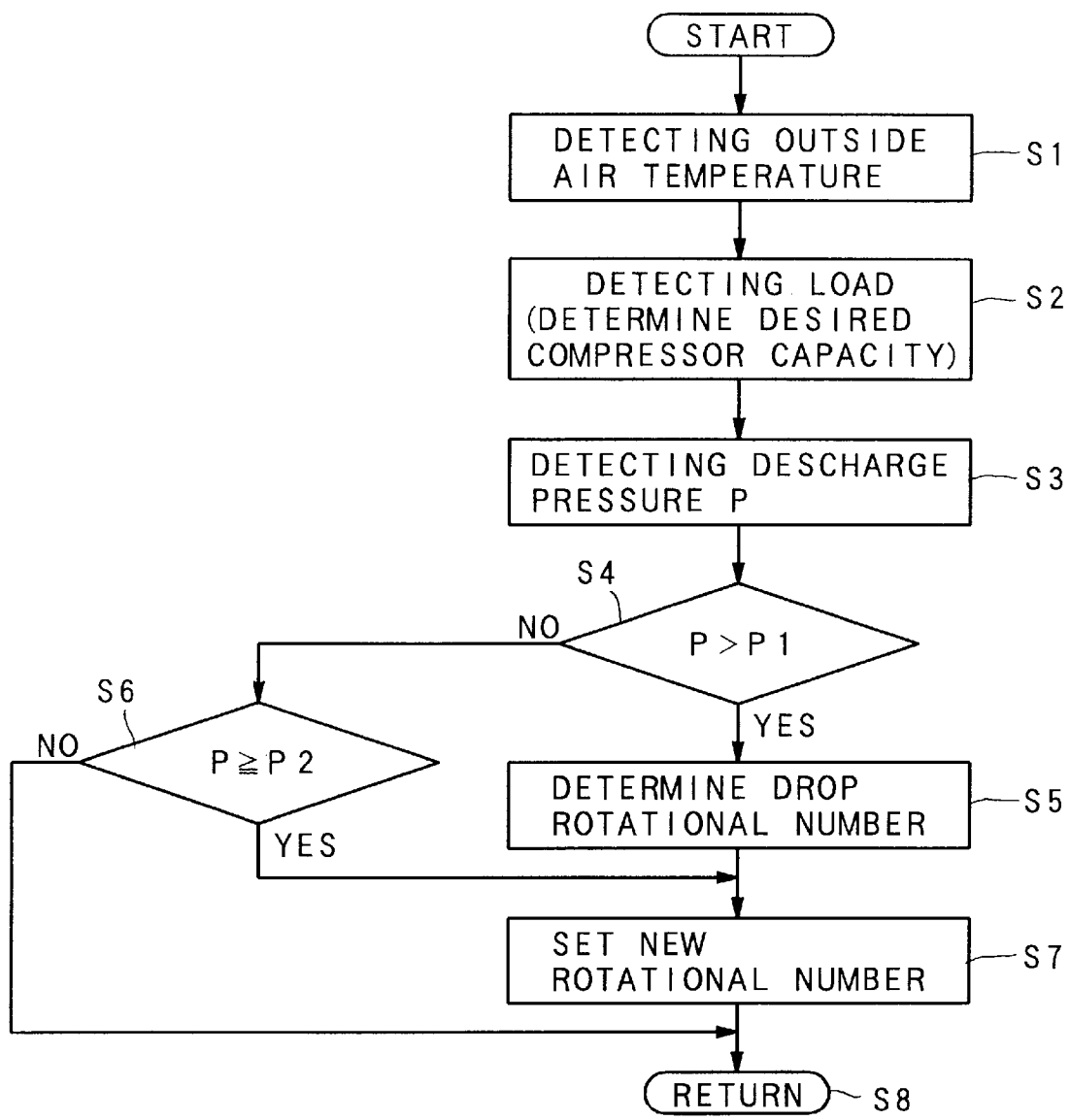
FIG. 5 is a flowchart showing a main driving control method for the air conditioner shown in FIG. 1.

Next, the control operation of the compressor 1 will be described with reference to the flowchart of FIG. 5.

Upon start of the control operation in start step, the outside air temperature is detected by the temperature sensor 44 in step S1. A detection signal representing the detected value is output to the microcomputer 41, and the process goes to step S2. In step S2, a desired driving compressor capacity (compressor rotational number) is calculated on the basis of a room-temperature set value (target temperature) set by the remote controller 60 and status signals from the various sensors, and then the process goes to step S3.

In step S3, the present pressure P (discharge pressure value) of the refrigerant circuit is detected by the pressure sensors 2, and then the process goes to step S4.

In step S4, the detected value is compared with the first pressure value P1. If the detected value P is higher than the first pressure value P1, the detected pressure value P is judged to belong to the drop zone C shown in FIG. 6, and the process goes to step S5 to output an instruction signal for driving the motor of the compressor at a driving rotational number which is lower than the present driving rotational number. On the other hand, if the detected value P is not more than the first pressure value P1, the process goes to step S6 to compare the detected value P with the second pressure value P2.

In step S6, if the detected value P is not less than the second pressure value P2, the detected pressure value is judged to belong to the increase-inhibiting zone B shown in FIG. 6, and thus the process goes to step S7. If the roation set value corresponding to a new request load is higher than the present driving rotational number, the rotational number set value is corrected so as to keep the present driving rotational number. On the other hand, if the new request load causes the present driving rotational number, the controller directly outputs an instruction signal representing the driving rotational number corresponding to the request load to the compressor motor. In step S7, the driving rotational number of the compressor is determined in consideration of the detected value from the room temperature sensor 20 and the detected value of the outside air temperature.

If the detected value P is less than the second pressure value P2, the detected pressure value P is judged to belong to the free zone A shown in FIG. 6, the compressor motor 43 is driven by directly using the rotational number signal which is calculated in accordance with the request load with no restriction by the rotational number calculator.

As described above, the driving rotational number is controlled in accordance with the detected value of the pressure of the refrigerant circuit so that the pressure is inhibited from further increasing or is forcedly reduced, whereby the refrigerant pressure can be prevented from increasing abnormally while preventing the reduction of the capacity in the cooling/heating operation. Furthermore, the mixture refrigerant is used in a refrigerant circuit which is designed to use single refrigerant, the manufacturing cost can be reduced.

The present invention is not limited to the above-described embodiment, and various modifications may be made without departing from the subject matter of the present invention.

For example, in the above description, the cooling operation is typically applied to the embodiment. However, the same effect can be obtained in the heating operation.

Furthermore, the pressure reduction rate in the drop zone C is not limited to a specific value. For example, plural drop zones may be set, and the reduction rate of the rotational number may be varied in accordance with each of the zones.

Still furthermore, the number and the disposing position of the pressure sensors are not limited to the above embodiments. Any number and any position may be adopted for the pressure sensors insofar as the same effect as described above is obtained.

According to the present invention, in the case where the refrigerant pressure of the refrigerant circuit is higher than the first pressure value, the capacity signal to be output to the compressor is corrected so that the driving capacity is lower than the present driving capacity even when the request load requires the capacity to further increase, and the compressor is driven in the basis of the corrected capacity signal. Therefore, the occurrence of abnormally high pressure in the refrigerant circuit can be prevented. In addition, the driving of the compressor is not interrupted, so that the reduction in the driving capacity can be prevented. Particularly when the mixture refrigerant is used, the cooling/heating operation can be efficiently performed without increasing the maximum permissible pressure value of the conventional refrigerant circuit.

Furthermore, according to the present invention, the second pressure value which is lower than the first pressure value is set, and when the pressure value of the refrigerant circuit exceeds the second pressure value, the second correction processor inhibits the present capacity from further increasing. Accordingly, in the range from the first pressure value to the second pressure value, the driving capacity of the compressor is inhibited from further increasing, and also it is not reduced. Therefore, the refrigerant pressure in the refrigerant circuit can be prevented from increasing to an abnormally high value. Particularly, the present invention can effectively used for such a case where the pressure increases rapidly.

Still furthermore, according to the present invention, the second pressure value is set to a value which is lower than the first pressure value by an amount of 2% to 3% of the first pressure value. Therefore, the driving operation of the compressor can be efficiently performed without interrupting the driving capacity of the air conditioner and with keeping a stable driving status.

What is claimed is:

1. An air conditioner which is provided with a refrigerant circuit comprising a capacity-variable type compressor, a condenser, an expansion device and an evaporator, and in which the driving capacity of said compressor is controlled on the basis of an air conditioning load, including:

at least two kinds of refrigerant which are circulated in said refrigerant circuit and which have different characteristics;

a calculator for calculating the driving capacity of said compressor in accordance with the requested power to said refrigerant circuit and outputting a signal representing the driving capacity;

a driving unit for changing the driving capacity of said compressor so as to obtain the driving capacity responding to the signal of said calculator;

first correction means for correcting the signal so as to reduce the driving capacity when the refrigerant pressure in said refrigerant circuit exceeds a first predetermined pressure value, the first pressure value being equal to or lower than a predetermined maximum pressure value for the refrigerant circuit; and second correction means for correcting the signal so as to inhibit the driving capacity from further increasing when the refrigerant pressure in said refrigeration circuit exceeds a second predetermined pressure value which is lower than the first predetermined pressure value.

2. The air conditioner as claimed in claim 1, wherein the second pressure value is set to a value which is lower than the first pressure value by an amount corresponding to 2% to 3% of the first pressure value.

3. The air conditioner as claimed in claim 1, wherein said first correction means corrects the driving capacity signal so as to reduce the present driving rotational number by a range from 1 Hz to 2 Hz when the refrigerant pressure in said refrigerant circuit exceeds the first pressure value.

4. A method for controlling an air conditioner which is provided with a refrigerant circuit comprising a capacity-variable type compressor, a condenser, an expansion device and an evaporator, and in which the driving capacity of said compressor is controlled on the basis of a load requested by the refrigerant circuit, comprising the steps of:

circulating at least two kinds of refrigerant in said refrigerant circuit, the refrigerants having different characteristics;

calculating the driving capacity of said compressor in accordance with the requested load to output a signal representing the driving capacity;

changing the driving capacity of said compressor so as to obtain the driving capacity corresponding to the driving capacity signal;

correcting the signal so as to reduce the driving capacity when the refrigerant pressure in said refrigerant circuit exceeds a first pressure value, the first pressure value being set to a value equal to or less than a maximum pressure value for the refrigerant circuit; and correcting the driving capacity signal so as to inhibit the driving capacity from further increasing when the refrigerant pressure in said refrigerant circuit exceeds a second pressure value which is lower than said first pressure value.

5. A control system for an air conditioner, the air conditioner including a refrigerant circuit comprising a capacity-variable type compressor, a condenser, an expansion device and an evaporator, and in which the driving capacity of said compressor is controlled on the basis of an air conditioning load, the control system comprising:

a calculator that is operative to calculate the driving capacity of said compressor in accordance with the requested power to said refrigerant circuit and output a signal representing the driving capacity;

a driving unit in communication with the calculator and with the compressor, the driving unit being operative to change the driving capacity of said compressor so as to obtain the driving capacity responding to the signal of said calculator; and a processor in communication with the calculator and programmed to correct the signal so as to reduce the driving capacity when the refrigerant pressure in said refrigerant circuit exceeds a first predetermined pressure value, the first pressure value being equal to or lower than a predetermined maximum pressure value for the refrigerant circuit, the processor being further programmed to correct the signal so as to inhibit the driving capacity from further increasing when the refrigerant pressure in said refrigeration circuit exceeds a second predetermined pressure value, the second pressure value being lower than the first predetermined pressure value.

6. The air conditioner of claim 5 wherein the second pressure value is set to a value which is lower than the first pressure value by an amount corresponding to 2% to 3% of the first pressure value.

7. The air conditioner of claim 5 wherein the processor is operative to correct the driving capacity signal to reduce the present driving rotational number from 1 Hz to 2 Hz when the pressure in the refrigerant circuit exceeds the first pressure value.

* * * * *